US011003154B2

(12) United States Patent
Okura et al.

(10) Patent No.: US 11,003,154 B2
(45) Date of Patent: May 11, 2021

(54) MOTOR CONTROL SYSTEM

(71) Applicant: Panasonic Intellectual Property Management Co., Ltd., Osaka (JP)

(72) Inventors: Mitsutaka Okura, Osaka (JP); Akinobu Tomita, Osaka (JP); Hiroshi Fujiwara, Osaka (JP); Yoshiaki Ikeuchi, Nara (JP)

(73) Assignee: PANASONIC INTELLECTUAL PROPERTY MANAGENENT CO., LTD., Osaka (JP)

( * ) Notice: Subject to any disclaimer, the term of this patent is extended or adjusted under 35 U.S.C. 154(b) by 0 days.

(21) Appl. No.: 16/091,545

(22) PCT Filed: Apr. 24, 2017

(86) PCT No.: PCT/JP2017/016129
§ 371 (c)(1),
(2) Date: Oct. 5, 2018

(87) PCT Pub. No.: WO2017/195578
PCT Pub. Date: Nov. 16, 2017

(65) Prior Publication Data
US 2019/0121313 A1    Apr. 25, 2019

(30) Foreign Application Priority Data
May 10, 2016    (JP) .................. 2016-094246

(51) Int. Cl.
*G05B 19/19*    (2006.01)
*G05D 3/00*    (2006.01)
(Continued)

(52) U.S. Cl.
CPC .............. *G05B 19/19* (2013.01); *G05D 3/00* (2013.01); *H02P 5/56* (2016.02); *H02P 6/08* (2013.01);
(Continued)

(58) Field of Classification Search
CPC ..... G05D 3/00; H02P 6/16; H02P 5/56; H02P 6/08
See application file for complete search history.

(56) References Cited

U.S. PATENT DOCUMENTS

2003/0128007 A1    7/2003    Fujisaki et al.
2007/0067052 A1    3/2007    Watanabe et al.
(Continued)

FOREIGN PATENT DOCUMENTS

JP    4-197095 A    7/1992
JP    3125015 B    1/2001
(Continued)

OTHER PUBLICATIONS

International Search Report of PCT application No. PCT/JP2017/016129 dated Jun. 6, 2017.
(Continued)

*Primary Examiner* — Said Bouziane
(74) *Attorney, Agent, or Firm* — McDermott Will and Emery LLP

(57) ABSTRACT

A motor control system includes motor control devices and a controller. The controller generates and transmits a communication signal including an operation command to the respective motor control devices. The motor control devices include two motor control devices in a first group, each of which includes a data transceiver, a motor controller, a corrector, and a synchronous timing generator, and a motor control device in a second group. The data transceiver receives an operation command issued to the motor control device, and receives operation information in the motor control device in the second group. Based on the operation command, the motor controller generates a torque command signal. The corrector generates a torque correction signal based on the operation information, and corrects the torque command signal. The synchronous timing generator gener-
(Continued)

ates a timing signal that matches pieces of process timing of the motor controllers in the first group with each other.

17 Claims, 9 Drawing Sheets

(51) Int. Cl.
    *H02P 5/56*     (2016.01)
    *H02P 6/08*     (2016.01)
    *H02P 6/16*     (2016.01)

(52) U.S. Cl.
    CPC ...... *H02P 6/16* (2013.01); *G05B 2219/41426* (2013.01); *G05B 2219/43117* (2013.01); *G05B 2219/50216* (2013.01); *G05B 2219/50218* (2013.01); *G05B 2219/50234* (2013.01)

(56) References Cited

U.S. PATENT DOCUMENTS

| | | | |
|---|---|---|---|
| 2010/0052581 A1* | 3/2010 | Izumi | B60K 6/48 318/400.04 |
| 2010/0185316 A1* | 7/2010 | Yamada | G05B 19/4142 700/189 |
| 2011/0169441 A1* | 7/2011 | Yoshiura | G05B 19/4141 318/625 |
| 2019/0025783 A1* | 1/2019 | Tamashima | G05B 19/042 |

FOREIGN PATENT DOCUMENTS

| | | |
|---|---|---|
| JP | 2003-189654 | 7/2003 |
| JP | 2004-070790 | 3/2004 |
| JP | 2004-326252 | 11/2004 |
| JP | 2006-285752 | 10/2006 |
| JP | 2007-018439 | 1/2007 |
| JP | 2008176673 A * | 7/2008 |

OTHER PUBLICATIONS

The Extended European Search Report dated Apr. 3, 2019 for the related European Patent Application No. 17795939.2.

* cited by examiner

MOTOR CONTROL SYSTEM

This application is a U.S. national stage application of the PCT International Application No. PCT/JP2017/016129 filed on Apr. 24, 2017, which claims the benefit of foreign priority of Japanese patent application 2016-094246 filed on May 10, 2016, the contents all of which are incorporated herein by reference.

TECHNICAL FIELD

The present invention relates to a motor control system including a plurality of motor control devices for controlling motors attached to respective axes.

BACKGROUND ART

In recent years, there has been used a motor control system that connects a host controller and a plurality of motor control devices to each other via a communication line. The motor control devices control motors attached to respective axes. The motor control system is used for varieties of machine tools and robots.

For example, as the motor control system, there is such a system including a controller, an X-axis motor control device for controlling an X-axis motor attached to an X axis, and a Y-axis motor control device for controlling a Y-axis motor attached to a Y axis.

In the motor control system, when a change occurs on one axis, the change may largely affect characteristics of the other axis. Specifically, when the X-axis motor attached to the X axis is controlled in order to move an object located on the X axis, a change may occur in characteristics of a mechanical system for use in operating the Y-axis motor. Hence, when the Y-axis motor is controlled, torque applied to the Y-axis motor becomes too large or too small in response to a load position on the X axis in the Y-axis motor control device. Hence, in the motor control system, a decrease of performance of damping vibrations and other malfunctions occur.

As a method for addressing the malfunctions as described above, heretofore, motor control system as follows has been disclosed. That is, in the conventional motor control system, in addition to position information of an own axis, information of any of position information of the other axis, a load inertia of a machine, or a weight of the machine is transmitted to a motor control device for a control target axis. Then, the motor control device for the control target axis controls a motor attached to the control target axis while sequentially changing control parameters on the basis of the transmitted information. Hence, this conventional motor control system ensures a function to suppress the influence given to the control for the other axis and to damp the vibrations even if the characteristics of the mechanical system vary to a large extent in a certain axis (for example, PTL 1).

Moreover, as another conventional motor control system, there is disclosed a motor control system in which a controller and a plurality of motor control devices for controlling motors attached to respective axes are subjected to daisy chain connection.

This conventional motor control system includes synchronous counters. In this motor control system, the synchronous counters are initialized at timing of receiving command data transmitted from the controller to the respective motor control devices. The plurality of motor control devices provided in the motor control system having the conventional configuration simultaneously receives the command data transmitted from the controller. Count up rates of all the synchronous counters are the same. Hence, the plurality of motor control devices simultaneously reflects the received command data on the control for the respective motors (for example, PTL 2).

Incidentally, in each of the motor control devices described in PTL 1, the change of the control parameters does not correspond to a communication cycle but is performed at arbitrary timing. That is, each of the motor control devices changes the control parameters without synchronizing with the others. Hence, when the X axis and the Y axis are not mechanically coupled to each other, it is conceivable that the following control is possible in a motor control system composed of an X-axis motor control device for controlling one X axis and a Y-axis motor control device for controlling one Y axis. That is, for example, in the Y-axis motor control device for controlling an object moving on the Y axis, in order to reflect the change occurring on the X axis, the control parameters are changed without adhering to the change occurring on the X axis. Even if such a control is performed, the performance of damping vibrations does not decrease in the conventional motor control system.

In contrast, as a configuration in which the X axis and the Y axis are mechanically coupled to each other, for example, a gantry mechanism is cited. For example, a motor control system having the gantry mechanism as described above includes: a head on which an X-axis load moves; and a pair of rails which drive both ends of the head in parallel in a Y-axis direction. The Y axis includes a Y1 axis and a Y2 axis, which are located in parallel to each other. That is, the motor control system having the gantry mechanism includes: one X-axis motor control device for controlling the X axis; and two Y-axis motor control devices for controlling the Y1 axis and the Y2 axis. Such parallel drive is also referred to as tandem drive.

In this configuration, for the purpose of suppressing unbalanced control, each of the Y1-axis motor control device and the Y2-axis motor control device changes the control parameters at timing of its own in order to reflect position information of the X-axis load on the head onto the Y1 axis and the Y2 axis.

However, when each of the control devices appropriately changes the control parameters at arbitrary timing, the following malfunction may occur. That is, between the Y-axis motor control devices for respectively controlling the Y1 axis and the Y2 axis, there is deviated timing of reflecting torque, which is required depending on a head position where the X-axis load is present, on the respective motors. Hence, torsion occurs between the Y1 axis and the Y2 axis, which are mechanically coupled to each other. Then, such torsion as above deteriorates positioning accuracy of the X-axis load, and deteriorates the vibration damping performance, and eventually, may result in safety degradation and failure.

CITATION LIST

Patent Literature

PTL 1: Unexamined Japanese Patent Publication No. 2004-70790

PTL 2: Unexamined Japanese Patent Publication No. 2003-189654

SUMMARY

In a motor control system according to the present invention, a plurality of motor control devices and a controller are connected to each other via a communication line.

Each of the plurality of motor control devices controls a motor connected to the motor control device itself. In order to control each of the motors, the controller generates a communication signal including an operation command for each of the motors. The controller transmits the generated communication signal to each of the plurality of motor control devices in a predetermined communication cycle.

The plurality of motor control devices includes two motor control devices in a first group and a motor control device in a second group.

Each of the motor control devices in the first group includes a data transceiver, a motor controller, a corrector, and a synchronizer.

The data transceiver receives an operation command in the communication signal, which is issued to the motor control device, and receives operation information in the communication signal, which relates to the motor control device in the second group.

Based on the operation command issued to the motor control device, the motor controller generates a torque command signal for controlling the motor connected to the motor control device.

The corrector generates a torque correction signal based on the operation information of the motor control device in the second group, and corrects the torque command signal of the motor control device using the torque correction signal.

The synchronous timing generator generates a timing signal that matches pieces of process timing of the motor controllers in the first group with each other.

In accordance with the motor control system of the present invention, the following functions and effects can be expected.

That is, in the motor control system in which the respective axes affect one another by being mechanically coupled to one another, and so on, the respective motors are required to be driven in synchronization with each other.

Accordingly, if the motor control system of the present invention is used, then the operation information of the other axes, such as the position information, can be reflected on the drive of each of the motors. Moreover, if the motor control system of the present invention is used, the respective motor control devices drive the respective motors in synchronization with one another.

Hence, for example, when the motor control system of the present invention is applied to a gantry mechanism, a load can be smoothly positioned in response to load characteristics occurring in the respective motor control devices.

For example, in a configuration of the gantry mechanism, when variations in load characteristics of two axes operating in parallel occur due to a position of a load mounted on the other axis than the two axes, torsion can be inhibited from occurring between both of the axes. Hence, the deteriorations of the positioning accuracy of the X-axis load and the vibration damping performance, which may be caused by such torsion, can be suppressed. In addition, safety can be ensured, and factors of failure can be reduced.

DESCRIPTION OF PREFERRED EMBODIMENTS

Motor control systems in exemplary embodiments of the present invention will be described with reference to the drawings. The following exemplary embodiments are merely examples of embodying the present invention, and do not limit the technical scope of the present invention.

First Exemplary Embodiment

Figure 1:
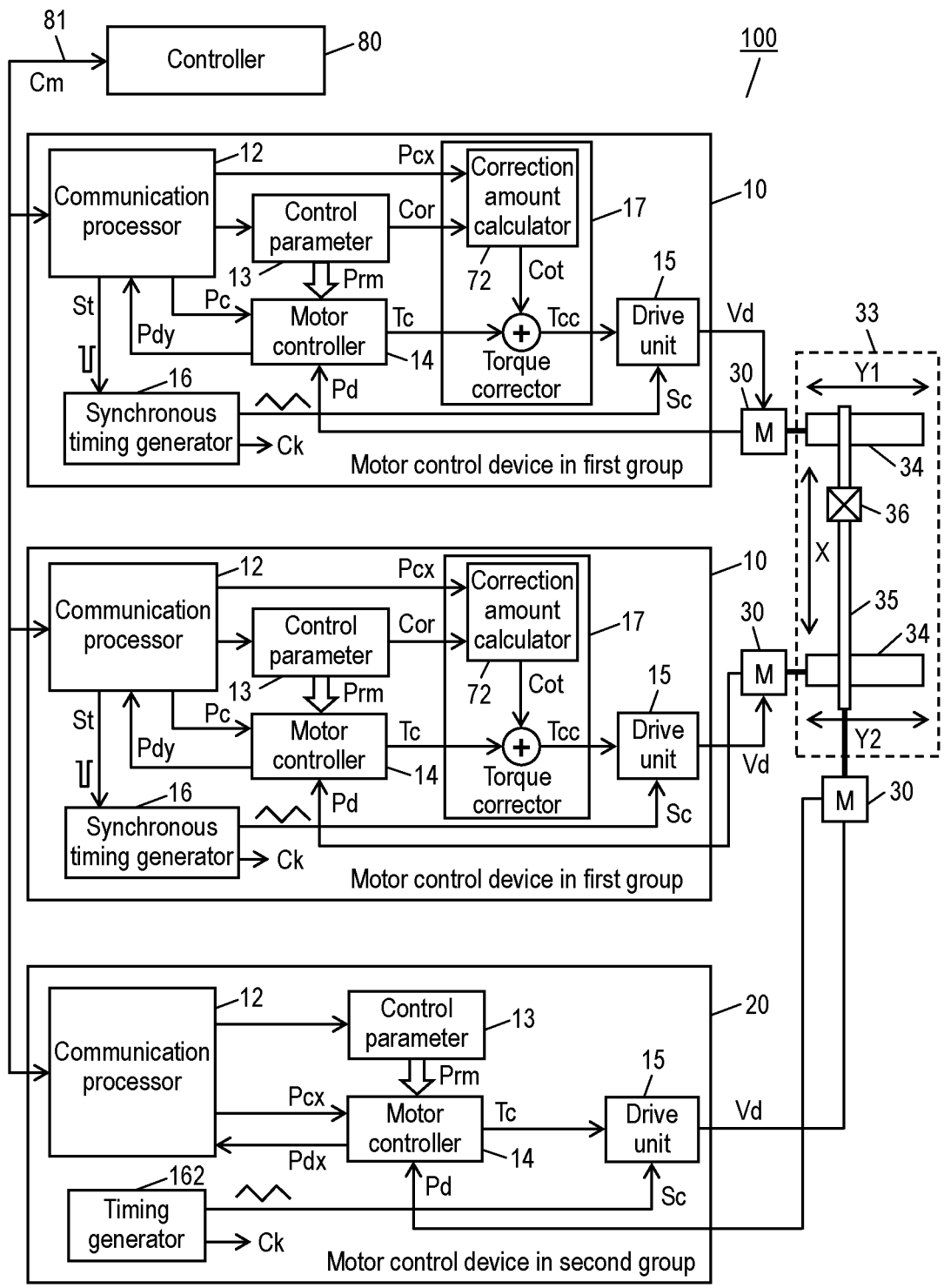
FIG. 1 is a configuration diagram of a motor control system in a first exemplary embodiment of the present invention.

FIG. 1 is a configuration diagram of a motor control system in a first exemplary embodiment of the present invention.

As illustrated in FIG. 1, motor control system 100 in the present exemplary embodiment has a configuration including: one control target mechanism 33; a plurality of motors 30; a plurality of motor control devices 10; one motor control device 20; and one controller 80. Controller 80 and each of motor control devices 10 and 20 are communicatively connected to each other via communication line 81. Control target mechanism 33 serving as a target to be controlled by motors 30 has a configuration including a plurality of axes. A motor device as a combination of one motor 30 and any one of motor control devices 10, 20 corresponds to each of the axes. In such a motor device, drive of motor 30 is controlled according to a command from motor control device 10, 20, and a load on one axis moves on the axis.

In the present exemplary embodiment, as an example of such a system having the plurality of axes, there is cited motor control system 100 for controlling control target mechanism 33 that is the above-mentioned gantry mechanism. Moreover, in the present exemplary embodiment, there is illustrated an example of a system composed of two axes which are an X axis and a Y axis as main axes in the plurality of axes of control target mechanism 33, in which the Y axis is composed of two axes which are a Y1 axis and a Y2 axis as sub-axes of the main axis. That is, the present exemplary embodiment can be applied to a system composed of a plurality of main axes, in which one of the main axes is composed of a plurality of sub-axes.

In order to construct a system for controlling the plurality of axes as described above, as illustrated in FIG. 1, motor control system 100 has a configuration including: a pair defined as a first group, that is, two motor control devices 10; and one motor control device 20 defined as a second group. Motor control devices 10 in the first group define, as the first group, the Y axis that is the main axis, and respectively controls motors 30 for two axes which are a pair of the Y1 axis and the Y2 axis. Motor control device 20 in the second group controls one motor 30 for the X-axis. As described above, in the present exemplary embodiment, as illustrated in FIG. 1, motor control system 100 is configured so that motor 30 for the Y1 axis is connected to first motor control device 10 in the first group, that motor 30 for the Y2 axis is connected to second motor control device 10 in the first group, and that motor 30 for the X axis is connected to motor control device 20 in the second group.

Moreover, as illustrated in FIG. 1, control target mechanism 33 with a gantry structure is composed of: two rails 34; head 35 disposed to cross over both rails 34; and load 36 mounted on head 35. Two rails 34 are disposed to go parallel to each other in association with the Y1 axis and the Y2 axis. Both ends of head 35 are mounted on respective rails 34, and are disposed to be movable in the Y-axis direction. Load 36 is mounted on head 35, and is disposed to be movable in an X-axis direction.

With such a configuration as described above, first motor control device 10 controls motor 30 to control a position of one end of head 35 disposed on the Y1 axis. Second motor control device 10 controls motor 30 to control a position of the other end of head 35 disposed on the Y2 axis. By such position control as above, both sides of head 35 mounting load 36 move on rails 34 at the same speed while maintaining the same position in the Y-axis direction except for the case of abnormality and other cases. That is, in this way, head 35 that serves as a load on the Y1 axis and a load on the Y2 axis moves on the Y axis composed of both rails 34. Moreover, motor 30 for the X axis, which is connected to motor control device 20 in the second group, performs position control so that load 36 on the X-axis moves in the X-axis direction on head 35.

Next, in the present exemplary embodiment, controller 80 communicatively connected to motor control devices 10, 20 is provided in order to set the control parameters for motor control devices 10, 20 and to give an operation command to motor control devices 10, 20. A specific communication technique in this communicative connection may be, for example, a data communication corresponding to the serial communication standard such as RS232C/485 or the universal serial bus (USB) standard, or may be the realtime express (RTEX) or ethernet for control automation technology (EtherCAT) communication that is a communication specification dedicated for a factory automation (FA) network.

Setting of the parameters as a communication content in the present exemplary embodiment is executed at the time of starting the system, changing operations of the system, and so on. The control parameters include a control gain, a setting value regarding characteristics of a filter, and the like. In addition to such setting of the parameters, controller 80 sends various types of information such as operation commands to motor control devices 10, 20 so that motors 30 perform desired motion operations, and receives various types of information from motor control devices 10, 20.

Particularly, while the setting of the parameters is performed irregularly such as at a time of initial setting, it is necessary to sequentially indicate operations in the system, the operations relating to the operation commands. Therefore, in the present exemplary embodiment, a reference cycle of sending the operation commands is set. That is, controller 80 sends a command signal including the operation commands such as a position commands and speed commands every communication cycle as the reference cycle. Each of motor control devices 10, 20 controls the operation of motor 30 on the basis of the received command signal. Moreover, each of motor control devices 10, 20 transmits a reply signal including operation information such as an operation state to controller 80 every communication cycle. Then, communication timing signal St is further transmitted from controller 80 every communication cycle though details will be described below. In FIG. 1, a signal sent via communication line 81 every communication cycle, the signal including these command signal, reply signal and communication timing signal St, is illustrated as communication signal Cm. In the present exemplary embodiment, a configuration example in which motor control devices 10, 20 control the positions of motors 30 is cited. Controller 80 provides the position commands to command target positions in the command signal, and issues the command signal to motor control devices 10, 20.

Figure 2:
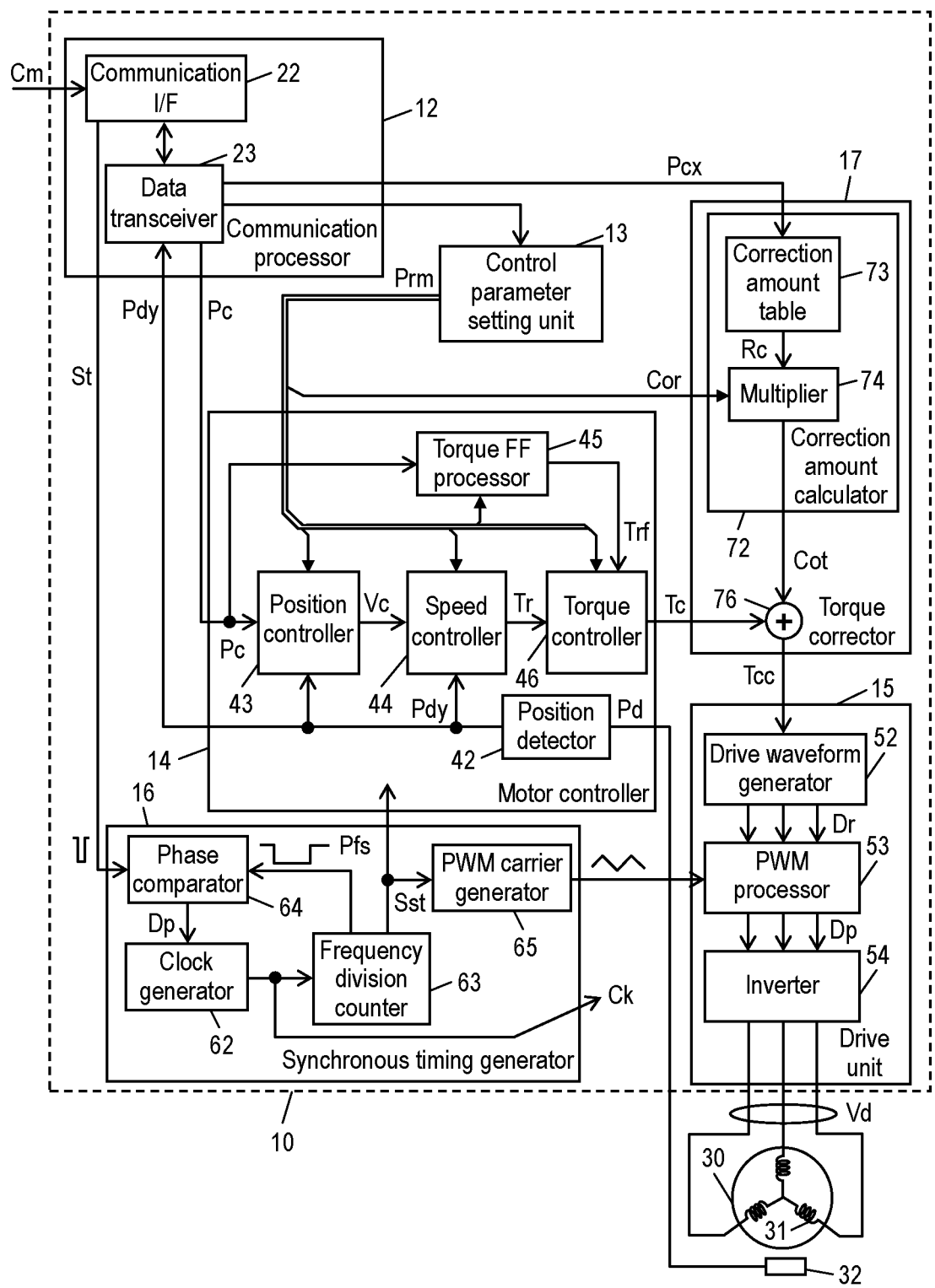
FIG. 2 is a block diagram of a motor control device in a first group of the motor control system.
Figure 3:
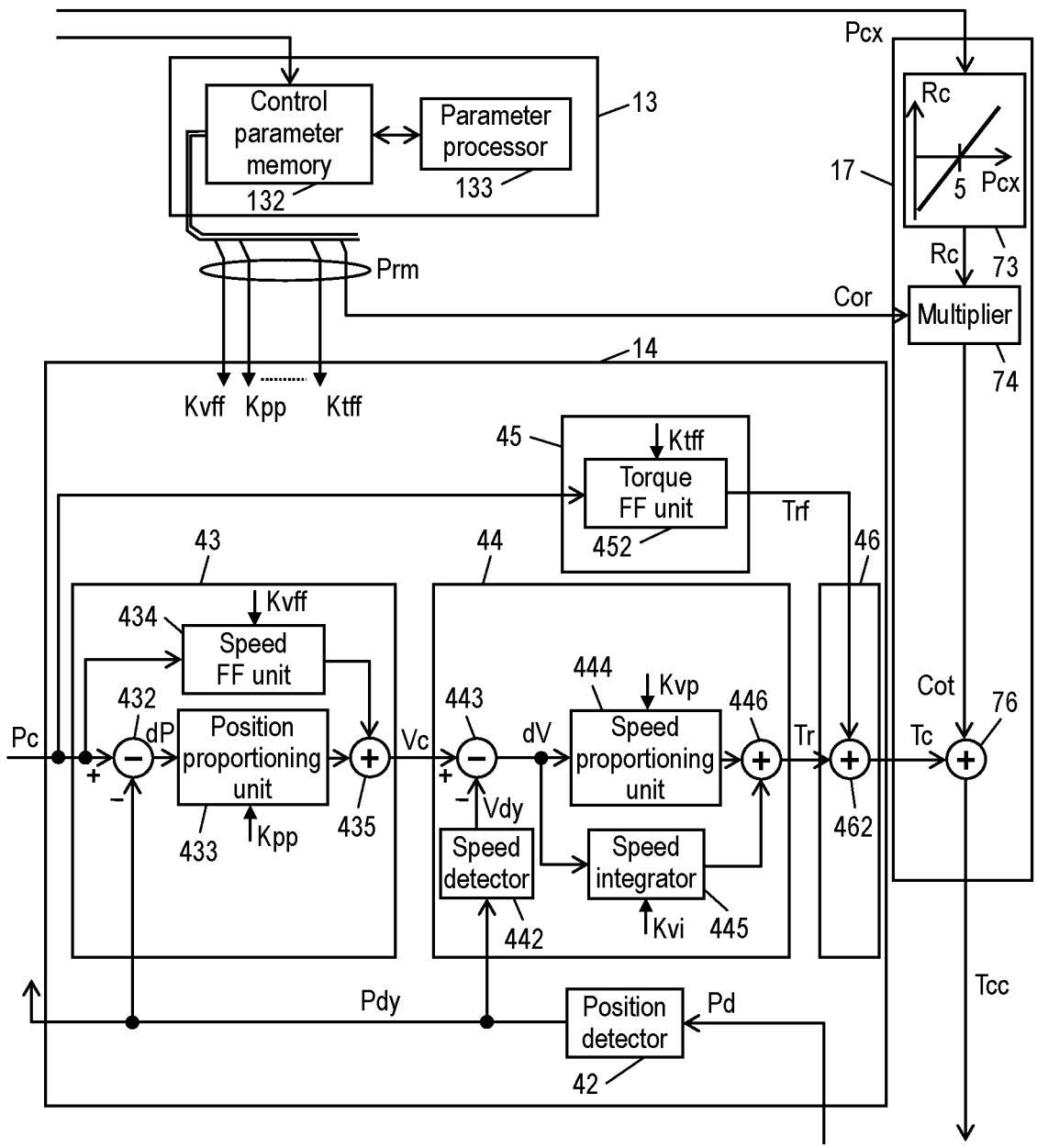
FIG. 3 is a block diagram illustrating a detailed configuration of main components of the motor control system.

FIG. 2 is a block diagram illustrating a detailed configuration of motor control device 10 in the first group of motor control system 100 in the present exemplary embodiment. FIG. 3 is a block diagram illustrating a detailed configuration of main components of motor control device 10, the configuration including a more detailed configuration of motor controller 14.

Next, the detailed configuration of motor control device 10 will be described with reference to FIG. 1, FIG. 2 and FIG. 3.

As illustrated in FIG. 1, motor control device 10 includes: communication processor 12; control parameter setting unit 13; motor controller 14; drive unit 15; synchronous timing generator 16; and torque corrector 17.

In motor control device 10, communication processor 12 is communicatively connected to communication line 81. Communication processor 12 receives the various types of information including the control parameters, the operation commands and others from controller 80, and transmits the various types of information in motor control device 10 to controller 80.

For example, at such as an initial setting time of starting the system, communication processor 12 receives a group of data as the control parameters from controller 80, and transfers the received data to control parameter setting unit 13. Here, in the present exemplary embodiment, the control parameters include a torque correction reference value Cor in addition to a variety of gains, a filter constant and the like.

When the initial setting is completed, controller 80 sends information including the operation command as the command signal in communication signal Cm every communication cycle, and communication processor 12 receives the information. The present exemplary embodiment cites an example in which operation information of the other axis, which is position information of load 36 in the X-axis direction, is also issued as the operation command in addition to position command Pc indicating a position commanded to motor control device 10 itself. Here, in the present exemplary embodiment, as the position information of load 36 in the X-axis direction, there is issued X-axis position command Pcx that is a position command indicating a position to be commanded to motor control device 20 for controlling the X axis. That is, motor control device 10 that is the first group receives this position command Pc as a first position command in communication processor 12. This first position command is an operation command to motor control device 10 in communication signal Cm. In addition, motor control device 10 receives this X-axis position command Pcx as a second position command. This second position command is operation information in motor control device 20 of the second group in communication signal Cm.

Motor controller 14 is notified of position command Pc, and position control following this position command Pc is executed by motor controller 14. Torque corrector 17 is notified of X-axis position command Pcx, and a corrected torque command is generated by torque corrector 17. As described above, the present exemplary embodiment is described by taking an example in which position command Pc is issued as the operation command and X-axis position command Pcx is issued as the operation information. However, naturally, in addition to these, other information and data may be issued as the operation command and the operation information.

Moreover, communication processor 12 is notified of the various types of information from the respective portions in motor control device 10. In the present exemplary embodiment, motor controller 14 notifies communication processor 12 of detection position information Pdy that is position information of the motor on the Y axis, the position information being detected by motor controller 14. Then, communication processor 12 notifies controller 80 of detection position information Pdy as a reply signal in communication signal Cm.

Moreover, as mentioned above, every communication cycle, controller 80 transmits communication timing signal St contained in communication signal Cm. Communication processor 12 detects this communication timing signal St, and notifies synchronous timing generator 16 of communication timing signal St thus detected. Here, while position command Pc is a signal serving as data, communication timing signal St is a pulse signal for indicating periodic timing. That is, though details will be described below, in the present exemplary embodiment, this communication timing signal St is used as a synchronization signal, and clock signal Ck synchronized with a cycle of communication timing signal St is generated in synchronous timing generator 16.

In order to execute these processes, as illustrated in FIG. 2, communication processor 12 includes communication interface (hereinafter, appropriately written as "communication I/F") 22 and data transceiver 23. Communication I/F 22 is a modulator/demodulator based on the communication specification in the communicative connection with controller 80. Communication I/F 22 transfers demodulated data to data transceiver 23, and in addition, modulates the data from data transceiver 23 on the basis of the communication specification, and transmits the modulated data to controller 80. Moreover, communication I/F 22 extracts communication timing signal St included in communication signal Cm, and supplies communication timing signal St to synchronous timing generator 16. Data transceiver 23 temporarily holds the data modulated/demodulated by communication I/F 22.

Next, in motor control device 10, control parameter setting unit 13 receives control parameter group Prm composed of a group of data from communication processor 12, for example, at the time of starting the system. As illustrated in FIG. 3, for example, control parameter setting unit 13 includes control parameter memory 132 and parameter processor 133.

Control parameter setting unit 13 stores received control parameter group Prm in control parameter memory 132, and sets such control parameters thus stored to predetermined functional units by a process of parameter processor 133. That is, for example as illustrated in FIG. 3, gains Kvff, Kpp, Ktff, constants and the like which are included in control parameter group Prm are set to functional units for control and process in motor controller 14. Moreover, in the present exemplary embodiment, torque correction reference value Cor included in control parameter group Prm is set to torque corrector 17.

Next, in motor control device 10, synchronous timing generator 16 generates clock signal Ck synchronized with the cycle of communication timing signal St as mentioned above, and further, generates PWM carrier signal Sc from clock signal Ck. Particularly, in the present exemplary embodiment, synchronous timing generator 16 as described above is provided so that first motor control device 10 corresponding to the Y1 axis and second motor control device 10 corresponding to the Y2 axis are processed in synchronization with each other. That is, each of first and second motor control devices 10 is subjected to the process while taking the timing of communication timing signal St as a reference. As described above, synchronous timing generator 16 generates such a timing signal as pieces of process timing of motor control devices 10 in the first group match with each other.

In order to generate these signals, as illustrated in FIG. 2, synchronous timing generator 16 includes clock generator 62, frequency division counter 63, phase comparator 64, and PWM carrier generator 65. Here, clock generator 62, frequency division counter 63, and phase comparator 64 constitute a so-called phase locked loop (PLL) circuit. Clock generator 62 generates clock signal Ck with a clock frequency corresponding to control signal Dp. Frequency division counter 63 generates pulse signal Pfs obtained by dividing clock signal Ck. Here, a division ratio of frequency division counter 63 is set so that a cycle of pulse signal Pfs becomes substantially the same as the cycle of communication timing signal St. Phase comparator 64 compares a phase of pulse signal Pfs as described above and a phase of communication timing signal St with each other, and generates control signal Dp based on the comparison. This control signal Dp is supplied to clock generator 62. By such a configuration, on the basis of the principle of the PLL, clock signal Ck is locked with communication timing signal St, and clock signal Ck is synchronized with communication timing signal St. As well known, clock signal Ck is used for a digital process in motor control device 10.

Moreover, a carrier generating pulse is supplied from frequency division counter 63 to PWM carrier generator 65. This carrier generating pulse is a signal with a duty ratio of 50%, which is obtained by dividing, in a predetermined division ratio, clock signal Ck synchronized with communication timing signal St. For example, PWM carrier generator 65 integrates such a carrier generating pulse by an integration circuit, thereby generating PWM carrier signal Sc that is a triangular wave. PWM carrier signal Sc is supplied to drive unit 15, and is used for generating drive voltages Vd using pulse width modulation (PWM). Moreover, the carrier generating pulse is supplied as a servo start timing signal Sst to motor controller 14, and a cycle of the carrier generating pulse is used as a reference cycle of control in motor controller 14.

Next, in motor control device 10, motor controller 14 and drive unit 15 are provided for controlling the operation of motor 30. Here, FIG. 2 cites an example in which a brushless motor of three-phase (UVW-phase) drive is used as motor 30. That is, motor 30 has a configuration including: a stator provided with windings 31 corresponding to the respective phases; and a rotor holding a permanent magnet. Drive voltages Vd in which phases are shifted by 120 degrees from one another are applied to respective windings 31 of this stator, whereby windings 31 are energized, and currents flow through windings 31 to rotate the rotor. Then, in response to the rotation of the rotor, the corresponding axis connected to the rotor is positionally controlled. Moreover, position sensor 32 for detecting a rotational position of the rotor is mounted on motor 30. Position sensor signal Pd corresponding to the rotational position of the rotor is output from position sensor 32, and motor controller 14 is notified of position sensor signal Pd. The present exemplary embodiment is described by taking an example in which the load is subjected to the linear position control by motor 30 performing such a rotational motion as above. However, a linear motor that directly performs the linear position control for the load may be used.

In order to control the drive of such motor 30 as above, motor controller 14 controls the position, speed and torque of motor 30. Then, drive unit 15 energizes and drives windings 31 of motor 30.

In order to execute such control as above, as illustrated in FIG. 2, motor controller 14 includes: position detector 42; position controller 43; speed controller 44; torque feedforward (hereinafter, written as "torque FF") processor 45; and torque controller 46. In these respective units, the gains and the constants, which are included in control parameter group Prm, are set by control parameter setting unit 13. Moreover, data transceiver 23 of communication processor 12 notifies motor controller 14 of position command Pc in the Y-axis direction every communication cycle. Then, position sensor 32 notifies position detector 42 of position sensor signal Pd, and position detector 42 generates detection position information Pdy in the Y-axis direction. Communication processor 12 is also notified of this detection position information Pdy, and further, controller 80 is notified of detection position information Pdy as a piece of information in the reply signal.

By such a configuration, motor controller 14 controls the motion operation so that the load position in the Y-axis direction follows position command Pc from controller 80 by feedback control using detection position information Pdy based on position sensor signal Pd.

In order to perform such feedback control as mentioned above by motor controller 14, first, as illustrated in FIG. 3, in position controller 43, subtractor 432 calculates a position deviation dP that is a difference between position command Pc and detection position information Pdy. Moreover, position proportioning unit 433 performs computation such as multiplication of position deviation dP by position gain Kpp. Moreover, FIG. 3 illustrates an example in which position controller 43 further includes speed feedforward (hereinafter, written as "speed FF") unit 434. Speed FF unit 434 performs computation such as multiplication of position command Pc by speed FF gain Kvff in addition to differential computation for position command Pc. In the example of FIG. 3, position controller 43 outputs a value obtained by adder 435 as speed command Vc. Adder 435 obtains the value by adding an output of speed FF unit 434 to an output of position proportioning unit 433. Speed controller 44 is notified of speed command Vc as a command of the speed.

Next, in speed controller 44 illustrated in FIG. 3, first, speed detector 442 detects the speed, and outputs the detected speed as detection speed Vdy. In order to detect the speed, for example, speed detector 442 performs the differential computation for detection position information Pdy, thereby detecting the speed. Moreover, subtractor 443 calculates speed deviation dV that is a difference between speed command Vc and detection speed Vdy, both of which are supplied to subtractor 443. Moreover, speed proportioning unit 444 performs proportional computation such as multiplication of speed deviation dV by speed gain Kvp. Meanwhile, speed integrator 445 integrates speed deviation dV, and further, multiplies speed deviation dV by integration gain Kvi. Then, adder 446 adds an output of speed proportioning unit 444 and an output of speed integrator 445 to each other, whereby a drive torque amount based on speed computation is calculated. This drive torque amount calculated in speed controller 44 is output as torque command Tr based on the speed computation.

Moreover, as illustrated in FIG. 2, the present exemplary embodiment illustrates an example in which motor controller 14 includes torque FF processor 45 and torque controller 46. As illustrated in FIG. 3, torque FF processor 45 includes torque FF unit 452. Torque FF unit 452 performs a first-order differentiation and second-order differentiation processes for position command Pc, and further, performs computation of multiplying an obtained differential value by torque FF gain Ktff, and outputs an obtained result of the multiplication as torque FF value Trf. Moreover, torque controller 46 is supplied with torque command Tr from speed controller 44 and with torque FF value Trf from torque FF processor 45. Torque controller 46 adds torque command Tr and torque FF value Trf to each other by adder 462. As described above, in the present exemplary embodiment, the value obtained by adding torque FF value Trf to torque command Tr based on the speed computation is set as a reference drive torque amount at which motor 30 is to be started, and this reference drive torque amount is output as torque command Tc.

Then, the present exemplary embodiment is characterized in that torque command Tc obtained by such a process as above of motor controller 14 is further corrected, and that motor 30 in the first group is driven on the basis of torque command Tcc thus corrected.

In the present exemplary embodiment, in order to generate such torque command Tcc as above, torque corrector 17 is provided. As illustrated in FIG. 2 and FIG. 3, torque corrector 17 includes correction amount calculator 72 and adder 76. Correction amount calculator 72 is notified of torque correction reference value Cor included in control parameter group Prm from control parameter setting unit 13. Moreover, from communication processor 12, correction amount calculator 72 is notified of X-axis position command Pcx that is a position command for motor control device 20 for controlling the X axis. Correction amount calculator 72 calculates torque correction amount Cot that is a correction amount for torque command Tc on the basis of these torque correction reference value Cor and X-axis position command Pcx. That is, adder 76 adds torque correction amount Cot to torque command Tc supplied to torque corrector 17, and torque corrector 17 outputs a result of the adding as corrected torque command Tcc.

Moreover, in order to calculate torque correction amount Cot, as illustrated in FIG. 2 and FIG. 3, correction amount calculator 72 includes correction amount table 73 and multiplier 74. Correction amount table 73 is a conversion table for converting X-axis position command Pcx into a correction ratio. That is, X-axis position command Pcx is supplied to this correction amount table 73, whereby correction ratio Rc is output from correction amount table 73. Multiplier 74 multiples torque correction reference value Cor by this correction ratio Rc, thereby obtaining torque correction amount Cot.

Though details will be described below, in correction amount table 73, a table is set to obtain correction ratio Rc as follows on the basis of X-axis position command Pcx. That is, in control target mechanism 33 with the gantry structure, the table is set so that correction ratio Rc is increased as load 36 is getting closer to subject rail 34. In other words, as X-axis position command Pcx is a command to bring load 36 closer to subject rail 34, correction ratio Rc is increased. In this way, torque command Tc is corrected to increase the torque amount as load 36 is getting closer to subject rail 34, and driving force for the Y1 axis and driving force for the Y2 axis are balanced. That is, for an imbalance due to the position of load 36 in the X-axis direction, torque command Tc is corrected so that the driving force is increased as load 36 is closer to subject rail 34.

Finally, in motor control device 10, drive unit 15 generates drive voltages Vd based on torque command Tcc supplied from torque corrector 17. In order to generate drive voltages Vd, as illustrated in FIG. 2, drive unit 15 includes drive waveform generator 52, PWM processor 53, and inverter 54.

Drive waveform generator 52 is notified of torque command Tcc. Drive waveform generator 52 generates signals with waveforms corresponding to a size of torque command Tcc. More specifically, for example, in the case of sinusoidally driving windings 31 in the respective phases of motor 30, drive waveform generator 52 generates sinusoidal waveforms with amplitude corresponding to the size of torque command Tcc for the respective phases, and supplies the sinusoidal waveforms as drive waveform signals Dr to PWM processor 53.

PWM processor 53 is supplied with PWM carrier signal Sc from PWM carrier generator 65 of synchronous timing generator 16, as well as is supplied with drive waveform signals Dr from PWM processor 53. PWM processor 53 makes amplitude comparison between triangular-wave PWM carrier signal Sc and triangular-wave drive waveform signals Dr, thereby performing pulse width modulation (PWM). In this way, for the respective phases, PWM processor 53 generates PWM signals Dp composed of pulse widths corresponding to levels of drive waveform signal Dr, or of pulse strings with duty ratios corresponding to the levels.

Inverter 54 receives PWM signals Dp of the respective phases from PWM processor 53, generates drive voltages Vd, and applies generated drive voltages Vd to respective windings 31 of motor 30. Inverter 54 is composed of switching elements and power conversion elements such as diodes. Inverter 54 switches, that is, turns on/off voltages, which are supplied from a power supply, in response to PWM signals Dp using the switching elements, thereby generating drive voltages Vd.

As above, in motor control device 10, drive voltages Vd thus generated are applied to windings 31 of motor 30, whereby windings 31 are energized, and motor 30 outputs torque corresponding to torque command Tcc. By such control and drive by motor control device 10 in the first group, one end of head 35 moves in the Y-axis direction on rail 34 so as to follow position command Pc from controller 80. Then, first motor control device 10 and second motor control device 10 in the first group are positionally controlled from controller 80 according to similar position commands Pc, whereby both ends of head 35 on which load 36 is mounted move at the same speed while maintaining the same positions in the Y-axis direction on rail 34. Particularly, in the present exemplary embodiment, as mentioned above, in both of motor control devices 10, the processes are executed in synchronization with communication timing signal St from controller 80. Therefore, also between both of the motor control devices, the processes are executed in synchronization with each other.

Next, a configuration of motor control device 20 will be described below.

As illustrated in FIG. 1, like motor control device 10, motor control device 20 includes: communication processor 12; control parameter setting unit 13; motor controller 14; and drive unit 15; and further, timing generator 162. Here, a detailed description of similar constituents to those of motor control device 10 will be omitted. Moreover, timing generator 162 is similar to synchronous timing generator 16 except that timing generator 162 does not have the function to be synchronized with communication timing signal St from controller 80. That is, timing generator 162 generates free-running clock signal Ck and PWM carrier signal Sc. Note that motor control device 20 may also have a configuration in which synchronous timing generator 16 is used as in motor control device 10 and is caused to generate clock signal Ck synchronized with the cycle of communication timing signal St. In short, in the present exemplary embodiment, it is essential that first motor control device 10 and second motor control device 10 synchronize with each other as described above.

From controller 80, motor control device 20 is notified of X-axis position command Pcx included in communication signal Cm. As mentioned above, X-axis position command Pcx is a position command in the X-axis direction for load 36 mounted on head 35. Motor controller 14 of motor control device 20 generates torque command Tc so that load 36 is located at a position corresponding to X-axis position command Pcx. Then, drive unit 15 of motor control device 20 applies drive voltages Vd corresponding to torque command Tc to windings 31 of motor 30. In such a way, the position control for load 36 is executed. Moreover, from communication processor 12, controller 80 is notified of detection position information Pdx generated in motor control device 20 on the basis of position sensor signal Pd. Detection position information Pdx is a piece of information in the reply signal.

Figure 4:
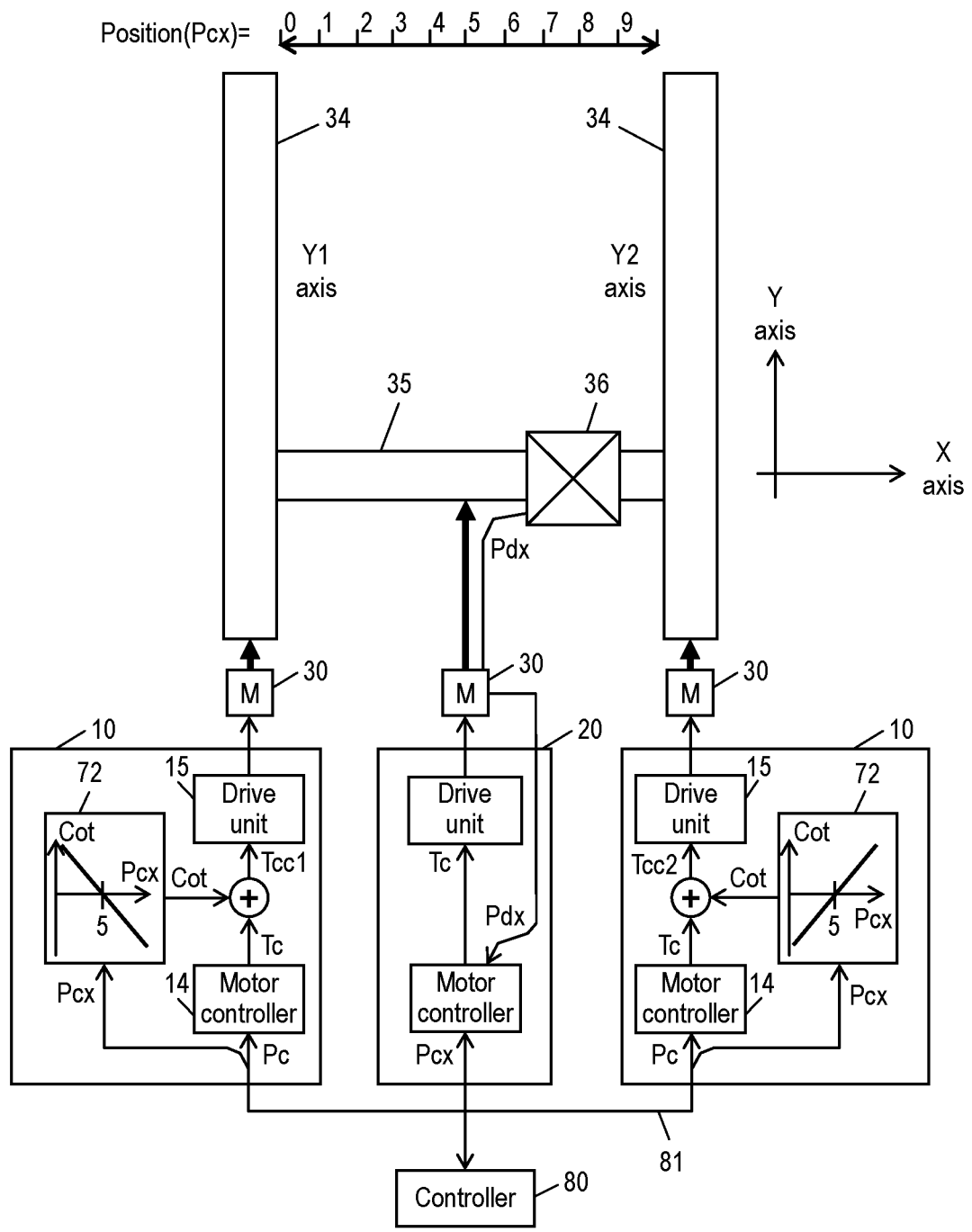
FIG. 4 is a configuration diagram for explaining operations of controlling a gantry mechanism in the motor control system.

FIG. 4 is a configuration diagram for explaining operations of controlling the gantry mechanism in motor control system 100 in the present exemplary embodiment.

Next, the processes for the torque corrections by torque correctors 17 will be described more in detail with reference to FIG. 4 and Table 1.

As illustrated in FIG. 4, in the present exemplary embodiment, the X axis is defined as the horizontal direction in the drawing. On head 35, marks are set on the X axis from position 0 taken as an origin and located on the left side to position 10 located on the right side. Position 5 is located on the center of head 35.

TABLE 1

| Position (Pcx) | Y1 axis | | Y2 axis | |
| --- | --- | --- | --- | --- |
| | Correction amount table output Rc | Torque correction amount Cot | Correction amount table output Rc | Torque correction amount Cot |
| 0 | 0.5 | 5 | −0.5 | −5 |
| 1 | 0.4 | 4 | −0.4 | −4 |
| 2 | 0.3 | 3 | −0.3 | −3 |
| 3 | 0.2 | 2 | −0.2 | −2 |
| ... | ... | ... | ... | ... |
| 5 | 0 | 0 | 0 | 0 |
| ... | ... | ... | ... | ... |
| 8 | −0.3 | −3 | 0.3 | 3 |
| 9 | −0.4 | −4 | 0.4 | 4 |
| 10 | −0.5 | −5 | 0.5 | 5 |

In this configuration, if the position of X-axis load 36, corrected torque command Tcc1 for the Y1 axis and corrected torque command Tcc2 for the Y2 axis satisfy relationships illustrated in Table 1, then head 35 smoothly moves in the Y-axis direction.

That is, when X-axis load 36 is located at position 5, both of corrected torque command Tcc1 for the Y1 axis and corrected torque command Tcc2 for the Y2 axis become uncorrected torque commands Tc.

If X-axis load 36 moves toward position 0, then corrected torque command Tcc1 for the Y1 axis performs +1 addition, and corrected torque command Tcc1 for the Y2 axis performs −1 subtraction. As a result, when X-axis load 36 is located at position 0, then corrected torque command Tcc1 for the Y1 axis becomes (Tc+5), and corrected torque command Tcc2 for the Y2 axis becomes (Tc−5).

If the torque commands described above are used, then head 35 moves smoothly without causing the torsion between the Y1 axis and the Y2 axis.

Incidentally, in motor control system 100 in the present exemplary embodiment X-axis load 36 and head 35 that is the Y-axis load appropriately move according to the instructions from controller 80. Hence, for example, both of motor control devices 10 perform the following control in order to move head 35 more smoothly.

That is, to motor control devices 10, controller 80 transmits latest position command Pcx of X-axis load 36 in addition to position commands Pc for motor control devices 10.

As a result, in motor control system 100, for example, every time X-axis load 36 moves by +1 in the direction toward position 0, torque correction amount Cot for torque command Tc is generated as +1 on the Y1 axis. At this time, torque correction amount Cot for torque command Tc is generated as −1 on the Y2 axis.

On the contrary, in motor control system 100, every time X-axis load 36 moves by +1 in the direction toward position 10, torque correction amount Cot for torque command Tc is generated as −1 on the Y1 axis. At this time, torque correction amount Cot for torque command Tc is generated as +1 on the Y2 axis.

As mentioned above, using torque correctors 17, this motor control system 100 performs computation so that corrected torque commands Tcc1, Tcc2 satisfy Table 1. In other words, corrected torque commands Tcc1, Tcc2 always become values for smoothly moving head 35 on which X-axis load 36 is mounted.

Hence, even if this motor control system 100 is used for control target mechanism 33 that is the gantry mechanism, the occurrence of the torsion due to the position of X-axis load 36 can be suppressed.

In the example of FIG. 4, X-axis load 36 moving on head 35 is located on the mark of position 8 on the X axis. Hence, torque correction amount Cot reflected on the Y1 axis becomes −3. Meanwhile, torque correction amount Cot reflected on the Y2 axis becomes +3.

As illustrated in FIG. 1, each torque corrector 17 reflects calculated torque correction amount Cot on torque command Tc generated in motor controller 14. Hence, in torque corrector 17, corrected torque command Tcc is derived. Drive unit 15 is notified of corrected torque command Tcc.

As described above, corrected torque command Tcc adds calculated torque correction amount Cot to torque command Tc generated in motor controller 14. When X-axis load 36 is located at position 8, corrected torque command Tcc on the Y1 axis becomes (Tc−3).

Likewise, when X-axis load 36 is located at position 8, corrected torque command Tcc on the Y2 axis becomes (Tc+3).

On the basis of torque command Tcc thus corrected, drive voltages Vd for driving motor 30 are generated in drive unit 15. Generated drive voltages Vd are output tot windings 31 of motor 30 according to servo start timing signal Sst. Motor 30 is driven in response to supplied drive voltages Vd.

Figure 5:
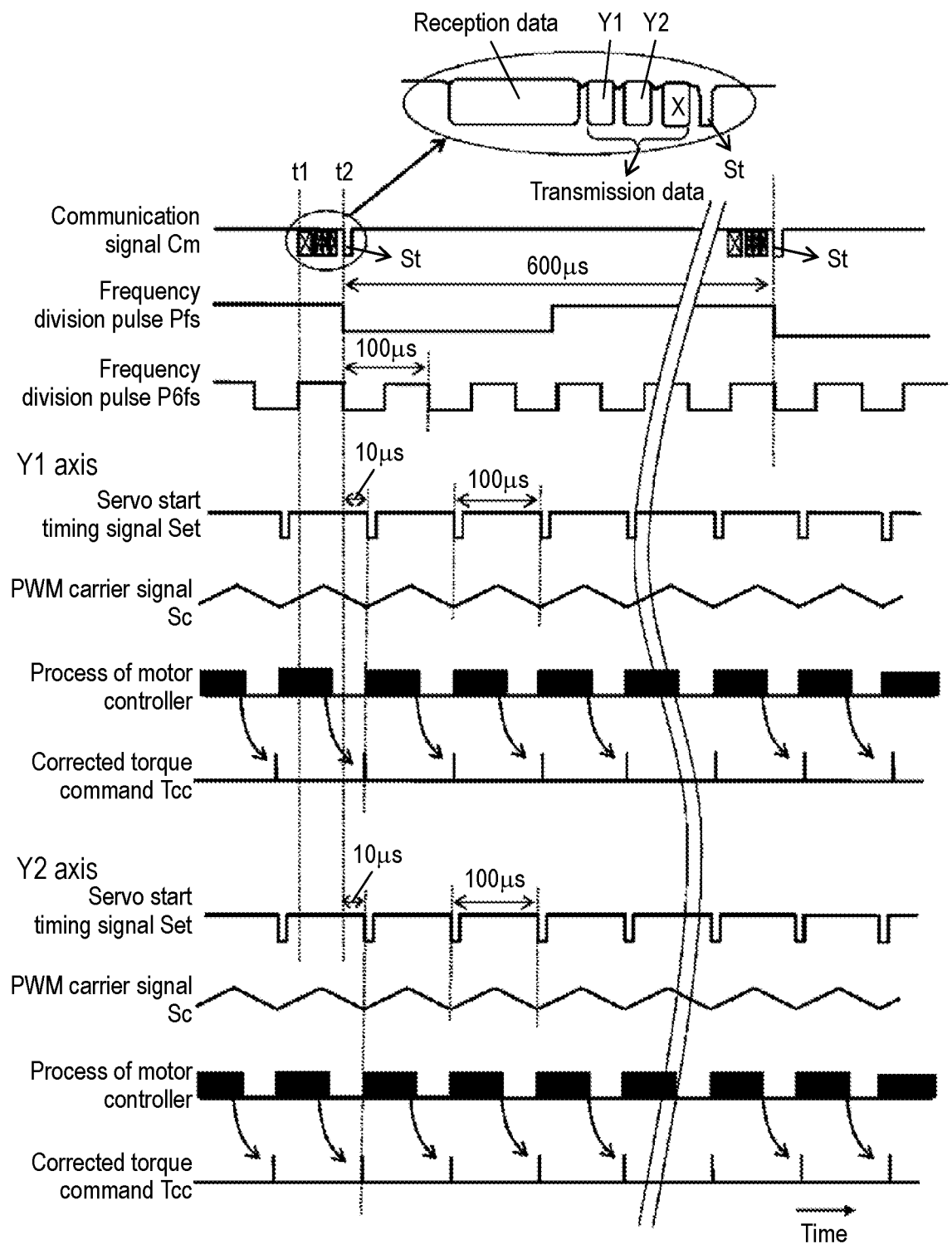
FIG. 5 is a timing chart of the motor control system.

FIG. 5 is a timing chart of motor control system 100 in the present exemplary embodiment.

Next, with reference to FIG. 5, a description will be given of the operations of the respective units of motor control system 100 while focusing on the operation in which motor control devices 10 execute the control and drive processes in synchronization with each other.

As illustrated in FIG. 2, each motor control device 10 is appropriately controlled on the basis of position command Pc of the subject axis, which is included in communication signal Cm transmitted from controller 80. At this time, position command Pcx to move X-axis load 36 is also transmitted from controller 80 to motor control device 10.

Hereinafter, with reference to the drawing, a description will be given below of the fact that motor control devices 10 individually operate in synchronization with each other while reflecting the movement occurring in X-axis load 36.

On an upper stage in FIG. 5, pieces of timing of the pulses generated by synchronous timing generator 16 are illustrated together with communication signal Cm. On a middle stage in FIG. 5, pieces of timing regarding first motor control device 10 corresponding to the Y1 axis are illustrated. On a lower stage in FIG. 5, pieces of timing regarding second motor control device 10 corresponding to the Y2 axis are illustrated.

At time t1, controller 80 transmits data to each of motor control devices 10 via communication line 81 while the data is superimposed on communication signal Cm. This data includes position command Pc for the subject axis and position command Pcx for the X axis.

Subsequently to the above transmission from controller 80, motor control device 10 transmits detection position information Pdy that is current position information about motor 30 attached to each of the axes via communication line 81 to controller 80. That is, such pieces of detection position information Pdy are included in transmission data in communication signal Cm as illustrated in an enlarged portion in FIG. 5, and are transmitted to controller 80 in order of the Y1 axis and the Y2 axis.

Thereafter, at time t2, controller 80 sends pulse-shaped communication timing signal St illustrated in FIG. 5. Communication processor 12 of each motor control device 10 extracts communication timing signal St from communication signal Cm, and transmits communication timing signal St to synchronous timing generator 16. Here, communication processor 12 transmits communication timing signal St to synchronous timing generator 16 so that timing of the motor drive executed in one motor control device 10 becomes the same as that in other motor control device 10 in consideration of the following points.

That is, such points to be considered include a frame length, an order of frames, a bit rate, a connection order of nodes and the like regarding the signal received via communication line 81.

As mentioned above, synchronous timing generator 16 includes the PLL circuit having clock generator 62, frequency division counter 63 and phase comparator 64. Using this PLL circuit, as illustrated in FIG. 5, synchronous timing generator 16 controls the frequency and phase of clock signal Ck of clock generator 62 so that a phase of a falling edge of communication timing signal St and a phase of a falling edge of frequency division pulse Pfs output from frequency division counter 63 coincide with each other. In this way, clock signal Ck and frequency division pulse P6fs, which are synchronized with communication timing signal St, are generated. Then, servo start timing signal Sst that is a pulse delayed by predetermined timing from frequency division pulse P6fs synchronized with communication timing signal St is generated. Moreover, PWM carrier signal Sc is generated on the basis of the timing of servo start timing signal Sst. Here, servo start timing signal Sst and PWM carrier signal Sc, which are thus generated, are also synchronized with communication timing signal St.

As described above, in order to achieve the following object, synchronous timing generator 16 adjusts clock signal Ck so that the phases of the PWM carrier signal and the like are synchronized with communication timing signal St when communication processor 12 transmits communication timing signal St. That is, the object to be achieved is to output servo start timing signal Sst in a preset cycle at a time delayed by predetermined timing after synchronous timing generator 16 receives communication timing signal St. In the present exemplary embodiment, the preset cycle is 1/n times (n is an integer) of the communication cycle.

Here, PWM carrier signal Sc will be described.

PWM carrier signal Sc is a triangular wave for use in performing pulse width modulation for the drive waveform corresponding to the size of torque command Tcc. That is, servo start timing signal Sst synchronized with PWM carrier signal Sc can be said to be a trigger of timing of adjusting drive voltages Vd supplied to motor 30. Hence, the control process performed in each motor control device 10 on the basis of the timing of servo start timing signal Sst is executed according to the cycle of PWM carrier signal Sc. As described above, the timing of supplying the currents to motor 30 in motor control device 10 and the timing of the control process executed in motor control device 10 are adjusted by synchronous timing generator 16 so as to be synchronized with communication timing signal St.

In the present exemplary embodiment, the communication cycle is preset to 0.6 ms (600 μs) per cycle. Moreover, one cycle of each of PWM carrier signal Sc and servo start timing signal Sst is set to ⅙ of the communication cycle. Here, when the clock frequency of clock signal Ck is set to 1 MHz, 600 divisions are set as the division ratio of frequency division counter 63, whereby frequency division pulse signal Pfs with one cycle of 0.6 ms can be generated. Moreover, 100 divisions are set as the division ratio of frequency division counter 63, whereby frequency division pulse signal P6fs with one cycle of 0.1 ms (100 μs) that is the same as that of servo start timing signal Sst can be generated. Moreover, FIG. 5 illustrates an example of a phase relationship in which servo start timing signal Sst is output when the PWM carrier signal is 0. Moreover, FIG. 5 illustrates an example in which servo start timing signal Sst is output after the elapse of 10 μs from falling timing of communication timing signal St.

In other words, in synchronous timing generator 16, PWM carrier signal Sc and the like are adjusted so as to be synchronized with communication timing signal St. Then, as a result of such adjustment as above, at the same timing in the timing of servo start timing signal Sst, each motor control device 10 executes the processes of motor controller 14, torque corrector 17 and drive unit 15.

In motor control device 10, torque corrector 17 calculates torque correction amount Cot corresponding to position command Pcs for the X axis. Torque corrector 17 adds calculated torque correction amount Cot to torque command Tc for the subject axis, which is generated by motor controller 14. Hence, in each of motor control device 10, corrected torque command Tcc is calculated.

As illustrated in FIG. 5, torque corrector 17 transmits torque command Tcc thus corrected to drive unit 15 at timing of servo start timing signal Sst in the next cycle.

In accordance with corrected torque command Tcc, drive unit 15 generates drive voltages Vd to be supplied to motor 30. Drive unit 15 supplies drive voltages Vd to motor 30 according to timing of servo start timing signal Sst that will be generated thereafter.

In this way, contents of the instructions for respective controllers 80 and motor control device 20 are reflected on motors 30 connected to respective controllers 80 in synchronization with each other.

That is, in this configuration, even if temporal variations occur in the respective computation steps in the respective process steps including those of motor controller 14, the contents of commands issued to respective motor control devices 10 are reflected on motors 30 in synchronization with each other because of the following reason. That is, the contents of commands issued to respective motor control devices 10 are executed every timing servo start timing signal Sst is output. In other words, one unit of the control signal transmitted from controller 80 to each of motor control devices 10 and the cycle of servo start timing signal Sst are synchronized with each other, whereby the control signals received by respective motor control devices 10 can be executed at the same timing.

In addition, latest position command Pcx for X-axis load 36 is reflected on drive voltages Vd supplied by motor control devices 10 to motors 30. Hence, even if motor control system 100 in the present exemplary embodiment is used for the gantry mechanism, the torsion caused by the position of X-axis load 36 does not occur.

As a result, this motor control system 100 can smoothly position the X-axis load in response to the load characteristics generated respectively in motor control devices 10, 20.

Second Exemplary Embodiment

Figure 6:
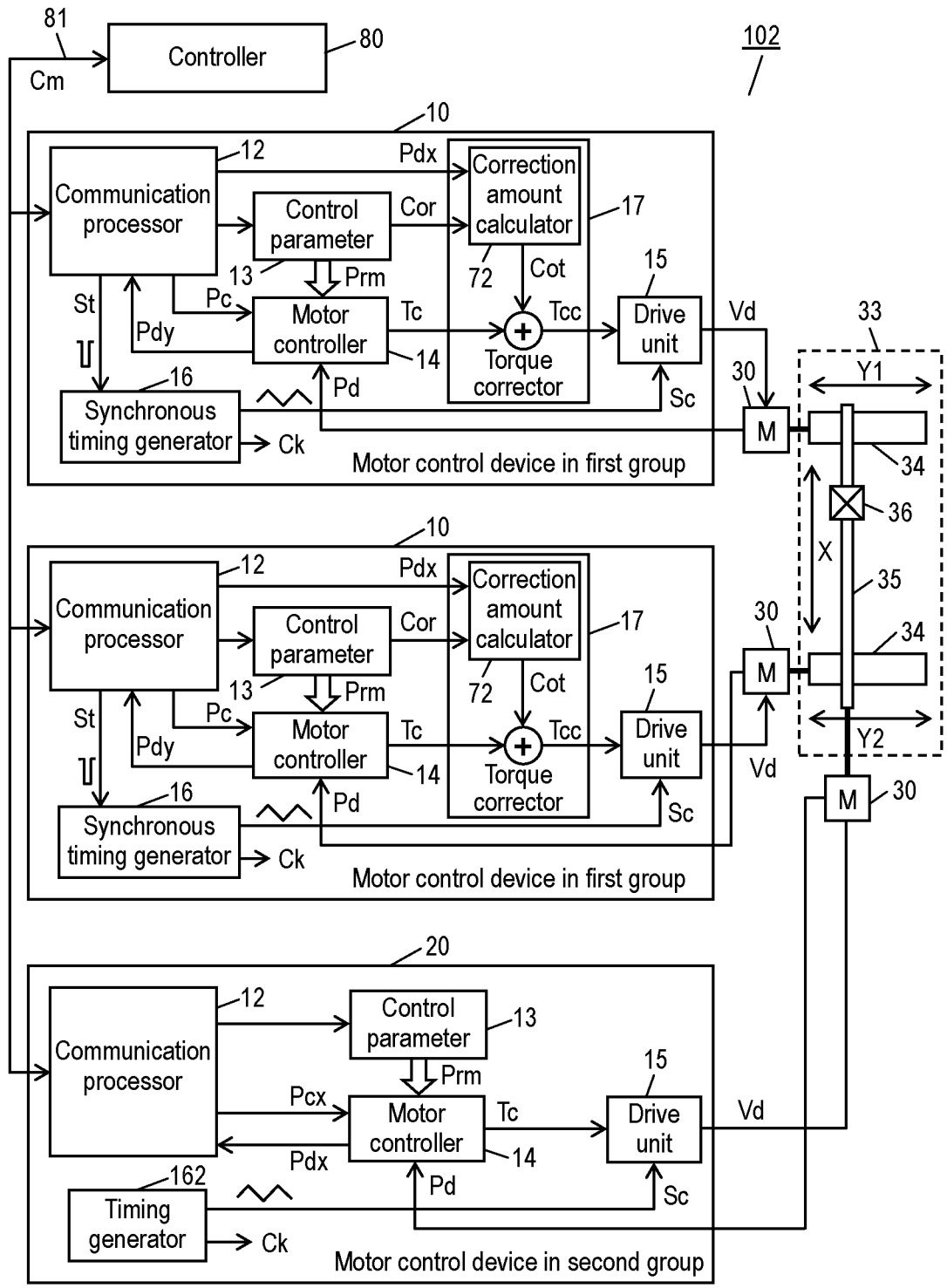
FIG. 6 is a configuration diagram of a motor control system in a second exemplary embodiment of the present invention.

FIG. 6 is a block diagram of motor control system 102 in a second exemplary embodiment of the present invention.

In FIG. 6, the same reference numerals are assigned to similar constituents to those of motor control system 100 in the first exemplary embodiment, and the description of the constituents will be incorporated by reference.

In comparison with motor control system 100 in the first exemplary embodiment, which is illustrated in FIG. 1, in motor control system 102 illustrated in FIG. 6, torque corrector 17 is supplied with detection position information Pdx indicating the detected position on the X axis. The second exemplary embodiment is different from the first exemplary embodiment in this configuration.

As illustrated in FIG. 5, communication signal Cm includes the data transmitted from motor control devices 10 and the data transmitted from motor control device 20. These data include detection position information Pdy of motor control devices 10 and detection position information Pdx of motor control device 20. Accordingly, each motor control device 10 as the first group extracts detection position information Pdx included in communication signal Cm every communication cycle. Detection position information Pdx is included as the operation information in motor control device 20 of the second group. Then, in each motor control device 10, detection position information Pdx on the X axis is supplied from communication processor 12 to torque corrector 17.

Like X-axis position command Pcx, this detection position information Pdx corresponds to the actual position of X-axis load 36.

In this way, torque correction amount Cot can be also obtained by using detection position information Pdx as the position in Table 1 in place of X-axis position command Pcx.

Third Exemplary Embodiment

Figure 7:
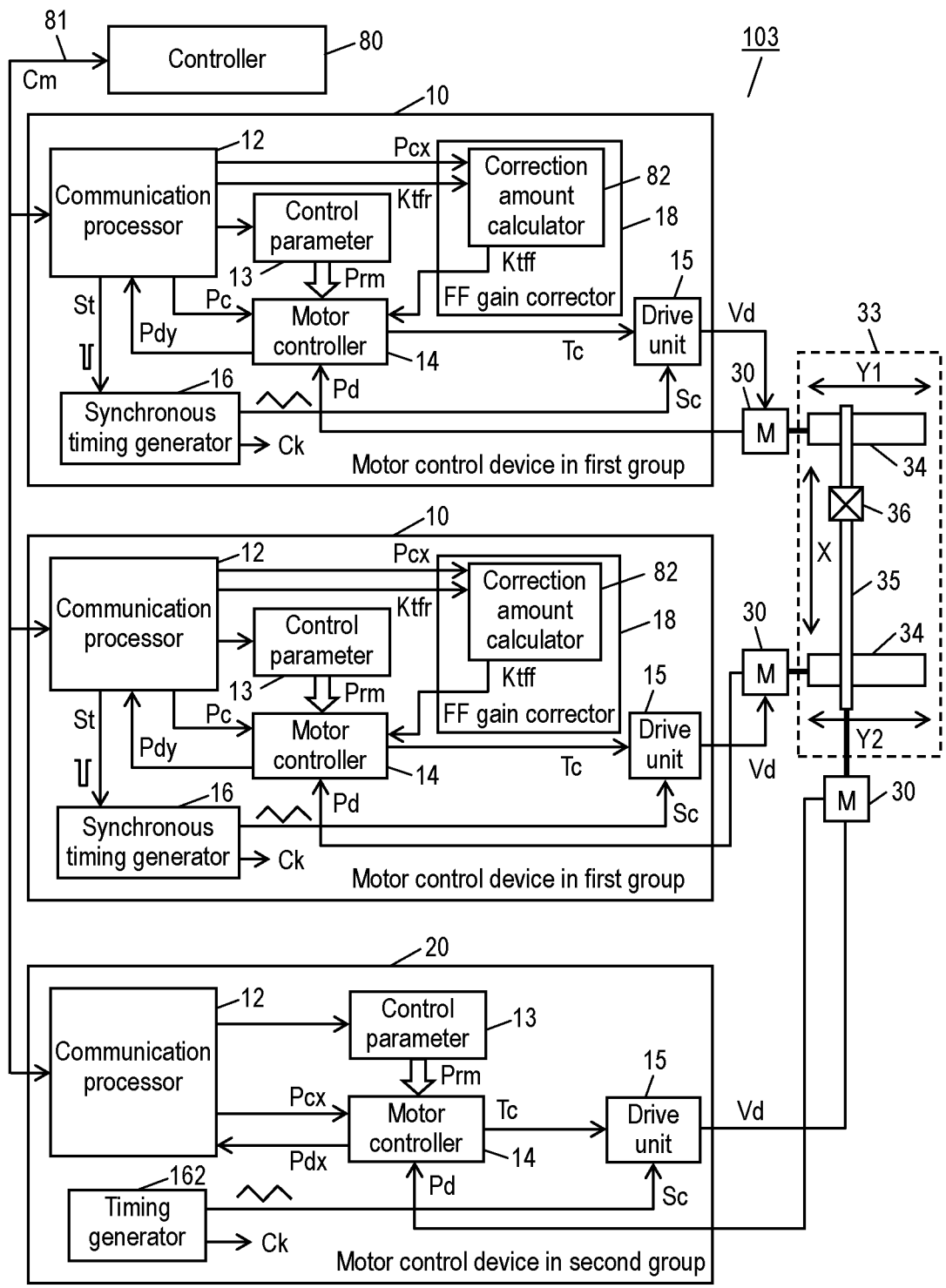
FIG. 7 is a configuration diagram of a motor control system in a third exemplary embodiment of the present invention.

FIG. 7 is a block diagram of motor control system 103 in a third exemplary embodiment of the present invention.

In FIG. 7, the same reference numerals are assigned to similar constituents to those of motor control system 100 in the first exemplary embodiment, and the description of the constituents will be incorporated by reference.

In comparison with motor control system 100 in the first exemplary embodiment illustrated in FIG. 1, in motor control system 103 illustrated in FIG. 7, each motor control device 10 includes FF gain corrector 18 in place of torque corrector 17. Moreover, from communication processor 12, this FF gain corrector 18 is supplied with torque FF gain reference value Ktfr together with X-axis position command Pcx. Then, from this FF gain corrector 18, torque FF processor 45 of motor controller 14 is supplied with torque FF gain Ktff.

That is, in the first exemplary embodiment, torque FF gain Ktff is supplied as one of the control parameters, for example, at the time of initial setting. In contrast, in the present exemplary embodiment, FF gain corrector 18 calculates torque FF gain Ktff. FF gain corrector 18 calculates this torque FF gain Ktff on the basis of X-axis position command Pcx and torque FF gain reference value Ktfr, which are supplied every communication cycle from communication processor 12.

Moreover, the present exemplary embodiment does not adopt a configuration of correcting the torque command as in the first exemplary embodiment, and accordingly, torque command Tc generated in motor controller 14 is supplied to drive unit 15.

In order to calculate torque FF gain Ktff in motor control device 10 as described above, FF gain corrector 18 including correction amount calculator 82 is provided as illustrated in FIG. 7 in the present exemplary embodiment. Every communication cycle, from communication processor 12, correction amount calculator 82 is notified of X-axis position command Pcx that is a position command for motor control device 20 for controlling the X axis, and is notified of torque FF gain reference value Ktfr for serving as a reference value of the torque FF gain in torque FF unit 452. Correction amount calculator 82 calculates torque FF gain Ktff on the basis of these torque FF gain reference value Ktfr and X-axis position command Pcx.

Figure 8:
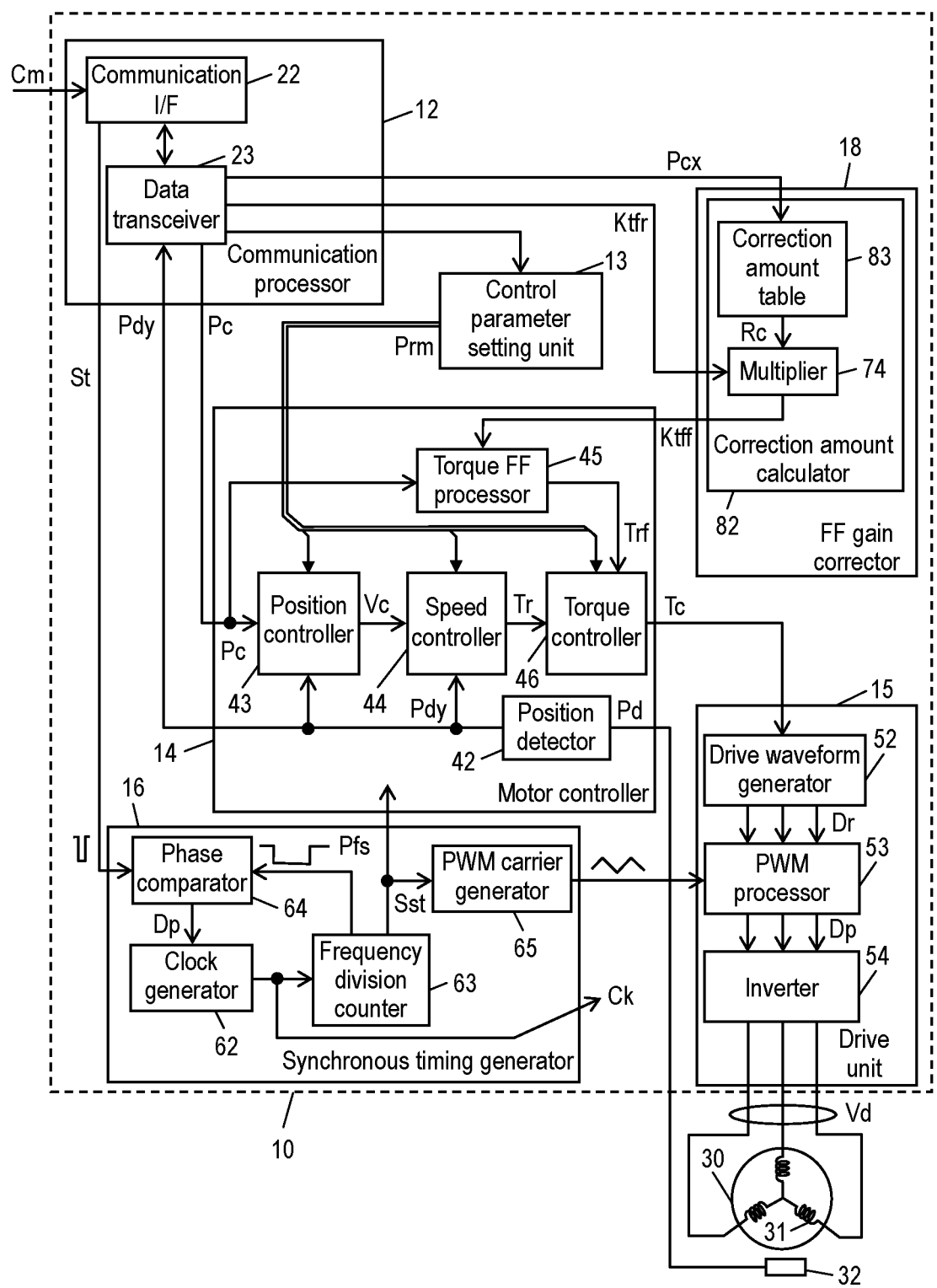
FIG. 8 is a block diagram of a motor control device in a first group of the motor control system.
Figure 9:
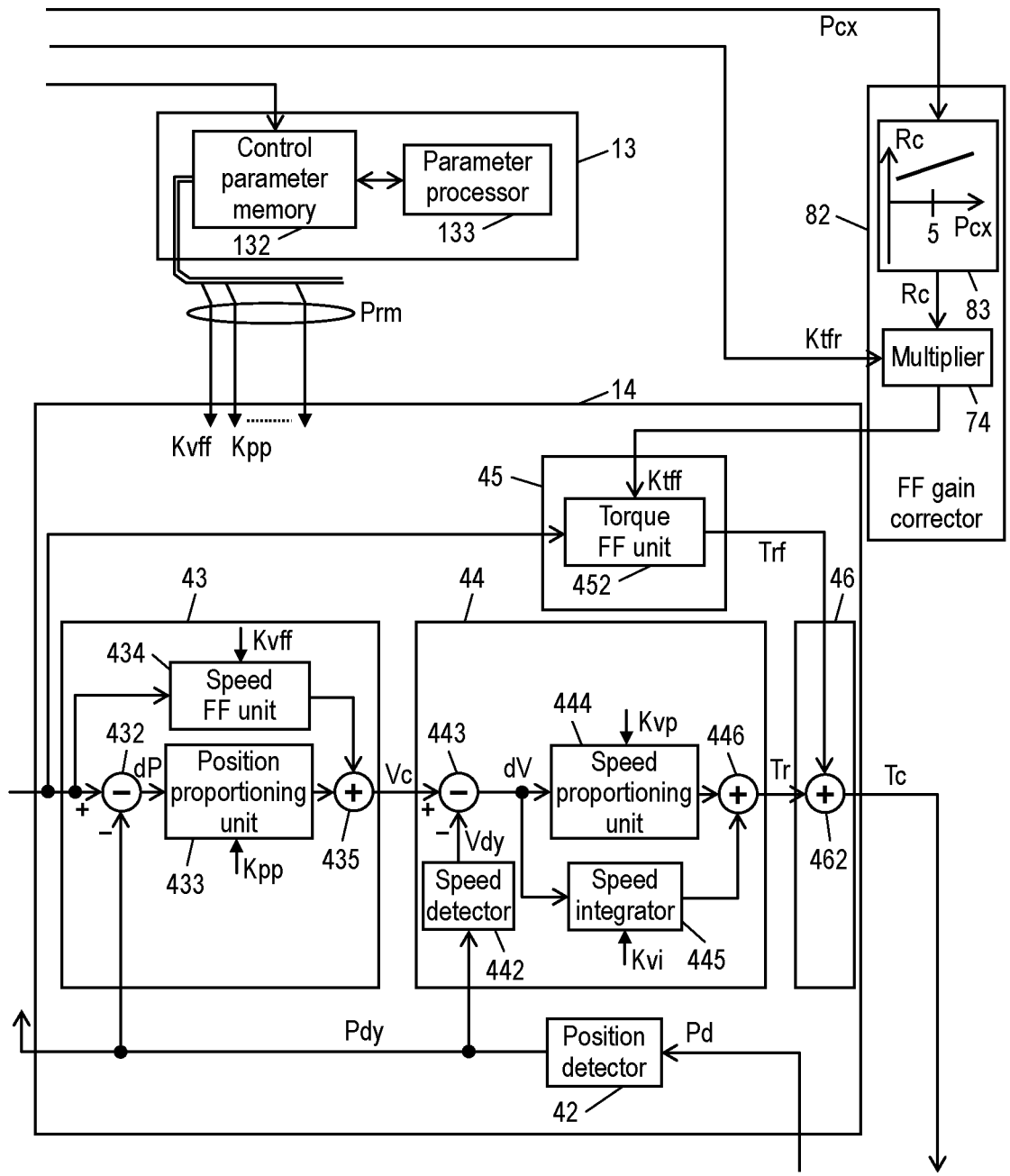
FIG. 9 is a block diagram illustrating a detailed configuration of main components of the motor control system.

Moreover, in order to calculate torque FF gain Ktff, as illustrated in FIG. 8 and FIG. 9, correction amount calculator 82 includes correction amount table 83 and multiplier 74. Correction amount table 83 is a conversion table for converting X-axis position command Pcx into a correction ratio. That is, X-axis position command Pcx is supplied to this correction amount table 83, whereby correction ratio Rc is output from correction amount table 83. Multiplier 74 multiplies torque FF gain reference value Ktfr by this correction ratio Rc, thereby obtaining torque FF gain Ktff.

Here, in correction amount table 83 in the present exemplary embodiment, a table is set to obtain correction ratio Rc as follows on the basis of X-axis position command Pcx. That is, in control target mechanism 33 with the gantry structure, the table is set so that correction ratio Rc is increased as load 36 is getting closer to subject rail 34. In other words, as X-axis position command Pcx is a command to bring load 36 closer to subject rail 34, correction ratio Rc is increased. In this way, torque command Tr is corrected to increase the torque amount by torque FF, that is, torque FF value Trf output from torque FF unit 452 as load 36 is getting closer to subject rail 34, and driving force for the Y1 axis and driving force for the Y2 axis are balanced. That is, for an imbalance due to the position of load 36 in the X-axis direction, torque command Tr is corrected so that the driving force is increased as load 36 is closer to subject rail 34.

As described above, also in the present exemplary embodiment, the imbalance due to the position of load 36 can be corrected. Accordingly, for example, also in the configuration of the gantry mechanism, when the load characteristics of the two axes operating in parallel vary due to the position of the head, the torsion can be inhibited from occurring between both of the axes.

Note that, as described in the second exemplary embodiment, detection position information Pdx may be used in place of X-axis position command Pcx also in the present exemplary embodiment.

The motor control system of the present invention is useful in controlling the motor control system including the plurality of motor control devices for controlling the motors attached to the respective axes.

The invention claimed is:

1. A motor control system that communicatively connects, via a communication line, a controller and a plurality of motor control devices respectively controlling motors to each other, the controller generating a communication signal including each of operation commands for controlling each of the motors and transmitting the generated communication signal to each of the plurality of motor control devices in a predetermined communication cycle, wherein:

the plurality of motor control devices includes two motor control devices in a first group and a motor control device in a second group, and each of the motor control devices in the first group includes:

a data transceiver that receives an operation command in the communication signal, the operation command being issued to the motor control device, and receives operation information in the communication signal, the operation information relating to the motor control device in the second group;

a motor controller that generates, based on the operation command, a torque command signal Tc for controlling the motor;

a corrector that generates a torque correction amount Cot based on the operation information, corrects the torque command signal Tc using the torque correction amount Cot, and generates a corrected torque command Tcc;

a drive unit that generates drive voltages Vd, based on the corrected torque command Tcc supplied from the corrector, and supplies the drive voltages Vd to each of the motor control devices in the first group; and a synchronous timing generator that generates a timing signal that matches pieces of process timing of the motor control devices in the first group with each other, the operation command is a position command that commands a position in order to drive the motor as a control target of the motor control device, the motor controller includes a torque feedforward processor that performs a torque feedforward process for the position command using a torque feedforward gain, and the corrector changes the torque feedforward gain based on the operation information, and sets an output of the torque feedforward processor as the torque correction signal.

2. The motor control system according to claim 1, wherein the synchronous timing generator generates the timing signal synchronized with the communication cycle, and the motor controller executes a process based on the timing signal.

3. The motor control system according to claim 2, wherein each of the motors controlled by the plurality of motor control devices positionally controls a load that constitutes a gantry mechanism.

4. The motor control system according to claim 1, wherein the operation command is a position command that commands a position for driving the motor as a control target of the motor control device, and the operation information is either a position command that commands a position with respect to the motor control device in the second group or position information indicating a position detected in the motor control device in the second group.

5. The motor control system according to claim 4, wherein each of the motors controlled by the plurality of motor control devices positionally controls a load that constitutes a gantry mechanism.

6. The motor control system according to claim 1, wherein the operation information is either a position command that commands a position with respect to the motor control device in the second group or position information indicating a position detected in the motor control device in the second group.

7. The motor control system according to claim 6, wherein each of the motors controlled by the plurality of motor control devices positionally controls a load that constitutes a gantry mechanism.

8. The motor control system according to claim 1, wherein each of the motors controlled by the plurality of motor control devices positionally controls a load that constitutes a gantry mechanism.

9. The motor control system according to claim 1, wherein:

the torque corrector includes a correction amount calculator and an adder, the correction amount calculator is notified of a torque correction reference value included in a control parameter group from a control parameter setting unit, from a communication processor, the correction amount calculator is notified of an X-axis position command that is a position command for the motor control device for controlling in a X axis, the correction amount calculator calculates a torque correction amount that is a correction amount for a torque command on basis of the torque correction reference value and the X-axis position command, the adder adds a torque correction amount to the torque command supplied to the torque corrector, and the torque corrector outputs a result of adding as a corrected torque command.

10. The motor control system according to claim 1, wherein:

the data transceiver receives the communication signal transmitted from the controller, detects a communication timing signal that the communication signal includes, and notifies the synchronous timing generator of the communication timing signal detected, and the synchronous timing generator generates:
a clock signal synchronized with a cycle of the communication timing signal; and
a PWM carrier signal generated from the clock signal, and the synchronous timing generator outputs the PWM carrier signal generated to the drive unit.

11. The motor control system according to claim 1, wherein:

the corrector includes a correction amount calculator that generates, based on the torque correction reference value Cor and the operation information, a torque correction amount Cot that is a correction amount for the torque command signal Tc, and the corrected torque command Tcc is generated by adding the torque command signal Tc and the torque correction amount Cot.

12. A motor control system that communicatively connects, via a communication line, a controller and a plurality of motor control devices respectively controlling motors to each other, the controller generating a communication signal including each of operation commands for controlling each of the motors and transmitting the generated communication signal to each of the plurality of motor control devices in a predetermined communication cycle, wherein:

the plurality of motor control devices includes two motor control devices in a first group and a motor control device in a second group, and each of the motor control devices in the first group includes:
a data transceiver that receives an operation command in the communication signal, the operation command being issued to the motor control device, and receives operation information in the communication signal, the operation information relating to the motor control device in the second group;
a motor controller that generates, based on the operation command, a torque command signal for controlling the motor;
a corrector that generates a torque correction signal based on the operation information and corrects the torque command signal using the torque correction signal; and
a synchronous timing generator that generates a timing signal that matches pieces of process timing of the motor control devices in the first group with each other, the operation command is a position command that commands a position in order to drive the motor as a control target of the motor control device, the motor controller includes a torque feedforward processor that performs a torque feedforward process for the position command using a torque feedforward gain, and the corrector changes the torque feedforward gain based on the operation information, and sets an output of the torque feedforward processor as the torque correction signal.

13. The motor control system according to claim 12, wherein the operation information is either a position command that commands a position with respect to the motor control device in the second group or position information indicating a position detected in the motor control device in the second group.

14. The motor control system according to claim 12, wherein each of the motors controlled by the plurality of motor control devices positionally controls a load that constitutes a gantry mechanism.

15. A motor control system that communicatively connects, via a communication line, a controller and a plurality of motor control devices respectively controlling motors to each other, the controller generating a communication signal including each of operation commands for controlling each of the motors and transmitting the generated communication signal to each of the plurality of motor control devices in a predetermined communication cycle, wherein:

the plurality of motor control devices includes two motor control devices in a first group and a motor control device in a second group, and each of the motor control devices in the first group includes:

a data transceiver that receives a first position command that commands a position for the motor control device in the communication signal, the first position command being issued to the motor control device, and receives a second position command that commands a position for the motor control device in the second group in the communication signal, a gain or a constant, and a control parameter including a torque correction reference value Cor, from the controller;

a motor controller that generates, based on the first position command, a torque command signal Tc for controlling the motor;

a corrector that generates a torque correction amount Cot based on the second position command, corrects the torque command signal Tc using the torque correction amount Cot, and generates a corrected torque command Tcc;

a control parameter setting unit that sets, in the motor controller, at least one of the gain and the constant received by the data transceiver, and sets, in the corrector, the torque correction reference value Cor;

a drive unit that generates drive voltages Vd, based on the corrected torque command Tcc supplied from the corrector, and supplies the drive voltages Vd to each of the motor in the first group; and a synchronous timing generator that generates a timing signal that matches pieces of process timing of the motor controller in the first group with each other.

16. The motor control system according to claim 15, wherein:

the motor controller includes a torque feedforward processor that performs a torque feedforward process for the first position command using a torque feedforward gain, and the corrector changes the torque feedforward gain based on the second position command, and sets an output of the torque feedforward processor as the torque correction signal.

17. The motor control system according to claim 15, wherein each of the motors controlled by the plurality of motor control devices positionally controls a load that constitutes a gantry mechanism.

\* \* \* \* \*